US010483566B2

(12) United States Patent
Wang et al.

(10) Patent No.: US 10,483,566 B2
(45) Date of Patent: Nov. 19, 2019

(54) METHOD AND CONTROL SUB-SYSTEM FOR OPERATING A POWER GENERATION SYSTEM HAVING A FUEL-CELL

(71) Applicant: CUMMINS ENTERPRISE LLC, Indianapolis, IN (US)

(72) Inventors: Honggang Wang, Clifton Park, NY (US); Andrew Philip Shapiro, Schenectady, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 0 days.

(21) Appl. No.: 15/925,791

(22) Filed: Mar. 20, 2018

(65) Prior Publication Data

US 2019/0296378 A1 Sep. 26, 2019

(51) Int. Cl.
| | |
|---|---|
| *H01M 8/02* | (2016.01) |
| *H01M 8/04228* | (2016.01) |
| *H01M 4/90* | (2006.01) |
| *H01M 8/1027* | (2016.01) |
| *H01M 8/04955* | (2016.01) |
| *H01M 8/04828* | (2016.01) |
| *H01M 8/04007* | (2016.01) |
| *H01M 8/14* | (2006.01) |
| *H01M 8/124* | (2016.01) |

(52) U.S. Cl.
CPC ..... *H01M 8/04228* (2016.02); *H01M 4/9016* (2013.01); *H01M 8/04007* (2013.01); *H01M 8/04947* (2013.01); *H01M 8/04955* (2013.01); *H01M 8/1027* (2013.01); *H01M 2008/1293* (2013.01); *H01M 2008/147* (2013.01)

(58) Field of Classification Search
CPC ....................................................... H01M 8/02
See application file for complete search history.

(56) References Cited

U.S. PATENT DOCUMENTS

| | | |
|---|---|---|
| 7,435,490 B2 | 10/2008 | England et al. |
| 8,841,039 B2 | 9/2014 | Sugiura |
| 8,920,993 B2 | 12/2014 | Li et al. |
| 9,005,827 B2 | 4/2015 | Nedergaard Clausen et al. |
| 9,478,814 B2 | 10/2016 | Åström |
| 2002/0028362 A1 | 3/2002 | Prediger et al. |

(Continued)

OTHER PUBLICATIONS

Kim et al., "Thermal cycling of anode supported solid oxide fuel cells under various conditions: Electrical anode protection", International Journal of Hydrogen Energy, vol. 41, Issue: 48, pp. 23173-23182, Dec. 28, 2016.

*Primary Examiner* — Jacob B Marks
(74) *Attorney, Agent, or Firm* — Barnes & Thornburg LLP (57) ABSTRACT

A method for operating a power generation system including a fuel-cell is presented. The method includes detecting a water deficient condition of the fuel-cell. The method further includes operating, in response to detecting the water deficient condition of the fuel-cell, at least one auxiliary load of the power generation system via use of an electrical current generated by the fuel-cell to maintain a steam-carbon ratio in the fuel-cell above a threshold steam-carbon ratio value. A control sub-system for operating the power generation system is also presented. Moreover, a power generation system including the fuel-cell, the least one auxiliary load, and the control sub-system is presented.

20 Claims, 6 Drawing Sheets

(56) References Cited

U.S. PATENT DOCUMENTS

| | | | |
|---|---|---|---|
| 2011/0014543 A1* | 1/2011 | Taniguchi | H01M 4/8605 |
| | | | 429/483 |
| 2014/0113162 A1 | 4/2014 | Hottinen et al. | |
| 2017/0179503 A1 | 6/2017 | Wang et al. | |

* cited by examiner

METHOD AND CONTROL SUB-SYSTEM FOR OPERATING A POWER GENERATION SYSTEM HAVING A FUEL-CELL

BACKGROUND

Embodiments of the present specification relate to a power generation system and, more particularly to a method and a control sub-system for operating a power generation system such that a steam-carbon ratio in a fuel-cell is maintained above a threshold steam-carbon ratio value.

A fuel-cell is an electrochemical energy conversion device that has demonstrated potential in terms of higher efficiency and lower pollution in comparison to that of coal and/or diesel based power generation systems. Common types of the fuel-cell include a polymer electrolyte membrane fuel-cell, a direct methanol fuel-cell, an alkaline fuel-cell, a phosphoric acid fuel-cell, a molten carbonate fuel-cell, and a solid oxide fuel-cell (SOFC). Fuel-cells, such as solid oxide fuel-cells (SOFCs) may operate in large-scale power generation systems to satisfy industrial and municipal needs. The fuel-cell typically includes an anode, a cathode, and an electrolyte disposed between the anode and the cathode. Typically, the fuel-cell generates electrical power based on a chemical reaction between hydrogen and steam received at the anode and oxygen/air received at the cathode.

In a traditional power generation system that employs the fuel-cell, the anode of the fuel-cell may get damaged and degraded due to deposition of carbon on the anode. As will be appreciated, during operation, the fuel-cell generates water or steam as an exhaust. The amount of water or steam generated by the fuel-cell is proportional to an amount of the electrical current generated by the fuel-cell. Moreover, in the traditional power generation systems, in certain situations, including, but not limited to, a loss or disconnection of an external load from the power generation system, a premature shut-down of the power generation system, a scheduled shut-down of the power generation system, or an abnormality of one or more internal components of the power generation system, the electrical current generated by the fuel-cell decreases. Consequently, the amount of water or steam generated by the fuel-cell may also decrease. Accordingly, in these instances, when the water or steam generated by the fuel-cell reduces below a certain amount, the amount of carbon deposited on the anode of the fuel-cell increases leading to the degradation of the anode. This degradation of the anode further causes reduction in the lifetime of the fuel-cell and reduction in an efficiency of the traditional power generation systems.

BRIEF DESCRIPTION

In accordance with aspects of the present specification, a method for operating a power generation system including a fuel-cell is presented. The method includes detecting a water deficient condition of the fuel-cell. The method further includes operating, in response to detecting the water deficient condition of the fuel-cell, at least one auxiliary load of the power generation system via use of an electrical current generated by the fuel-cell to maintain a steam-carbon ratio in the fuel-cell above a threshold steam-carbon ratio value.

In accordance with another aspect of the present specification, a control sub-system for operating a power generation system including a fuel-cell and at least one auxiliary load is presented. The control sub-system includes a sensor coupled to the fuel-cell and configured to generate an electrical signal indicative of an electrical current generated by the fuel-cell. The control sub-system further includes one or more switches coupled between the fuel-cell and the at least one auxiliary load. Moreover, the control sub-system includes a controller operatively coupled to the sensor and the one or more switches. The controller is configured to detect a water deficient condition of the fuel-cell based on the electrical signal generated by the sensor. The controller is further configured to operate, if the water deficient condition is detected, the at least one auxiliary load of the power generation system via use of the electrical current generated by the fuel-cell to maintain a steam-carbon ratio in the fuel-cell above a threshold steam-carbon ratio value.

In accordance with yet another aspect of the present specification, a power generation system is presented. The power generation system includes a fuel-cell, at least one auxiliary load, and a control sub-system operatively coupled to the fuel-cell and the at least one auxiliary load. The control sub-system includes a sensor coupled to the fuel-cell and configured to generate an electrical signal indicative of an electrical current generated by the fuel-cell. The control sub-system further includes one or more switches coupled between the fuel-cell and the at least one auxiliary load. Moreover, the control sub-system includes a controller operatively coupled to the sensor and the one or more switches. The controller is configured to detect a water deficient condition of the fuel-cell based on the electrical signal generated by the sensor. The controller is further configured to operate, if the water deficient condition is detected, the at least one auxiliary load of the power generation system via use of the electrical current generated by the fuel-cell to maintain a steam-carbon ratio in the fuel-cell above a threshold steam-carbon ratio value.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this specification belongs. In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be noted that the term "fluid" as used herein includes any medium or material that flows, including, but not limited to, gas, liquid, or a combination thereof. Further, the term "fluidly coupled," as used herein, refers to an arrangement or a connection between two components that facilitates flow of fluid from one component to another component or vice-versa.

Figure 1:
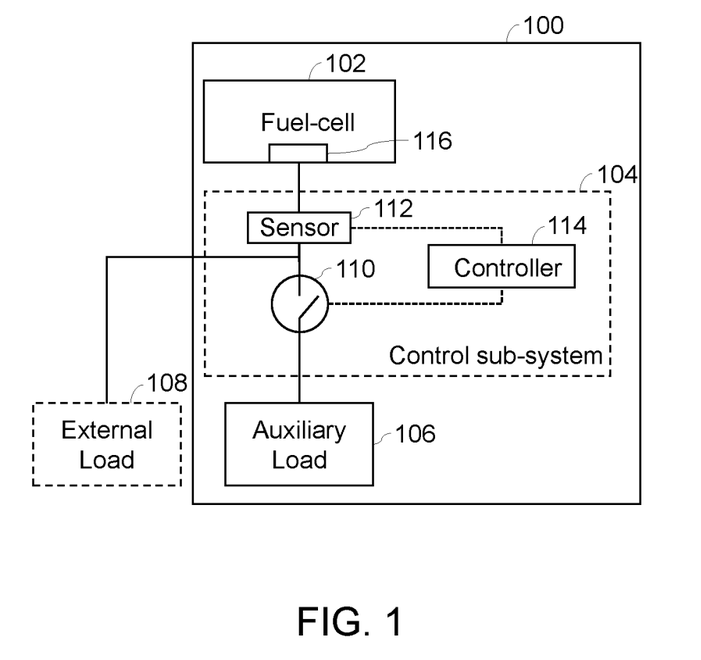
FIG. 1 is a block diagram of a power generation system, in accordance with aspects of the present specification.

FIG. 1 is a block diagram of a power generation system 100, in accordance with aspects of the present specification. The power generation system 100 of FIG. 1 includes a fuel-cell 102, a control sub-system 104, and at least one auxiliary load such as an auxiliary load 106. The control sub-system 104 may include one or more switches such as a switch 110, one or more sensors such as a sensor 112, and a controller 114. Moreover, an external load 108 may also be electrically coupled to the power generation system 100.

During operation, the power generation system 100 generates electrical power and supplies the electrical power to the external load 108. The external load 108 may be operated via the electrical power supplied from the power generation system 100. The external load 108 may include one or more electrical devices, appliances, and/or apparatus that consume electricity/electrical power. In certain embodiments, the external load 108 may be an electric grid including, but not limited to, a microgrid or a utility electric grid.

The fuel-cell 102 typically includes an anode (not shown in FIG. 1), a cathode (not shown in FIG. 1), and an electrolyte (not shown in FIG. 1) disposed between the anode and the cathode. The fuel-cell 102 may generate the electrical power based on a chemical reaction between hydrogen and steam received at the anode and oxygen/air received at the cathode, in some embodiments. Non-limiting examples of the fuel-cell 102 may include a polymer electrolyte membrane fuel-cell, a direct methanol fuel-cell, an alkaline fuel-cell, a phosphoric acid fuel-cell, a molten carbonate fuel-cell, an SOFC, or a reversible fuel-cell. The fuel-cell 102 will be described in greater detail in conjunction with FIG. 2.

The auxiliary load 106 may be representative of one or more internal electrical loads of the power generation system 100. In certain embodiments, the auxiliary load 106 aids in the generation of the electrical power by the fuel-cell 102. The auxiliary load 106 may include one or more of a steam boiler, an air blower, fuel blower, a fuel flow regulator, or combinations thereof (see FIG. 2). In some embodiments, the auxiliary load 106 may be operated via an external electrical source such as the utility electric grid or local energy storage device (not shown). In certain embodiments, the auxiliary load 106 may also include an add-on or dummy load such as a capacitor bank, an energy storage device, a pump, a ventilation blower, an electrolyzer, one or more resistors, or combinations thereof. The auxiliary load 106 may be electrically connectible to the fuel-cell 102 via the control sub-system 104.

In a traditional power generation system that employs a fuel-cell, an anode of the fuel-cell may get damaged and degraded due to deposition of carbon on the anode. In particular, a functioning fuel-cell generates water or steam as exhaust. The amount of water or steam generated by the fuel-cell is proportional to an amount of electrical current generated by the fuel-cell. In certain situations, including, but not limited to, a loss or disconnection of an external load from the power generation system, a premature shut-down of the power generation system, a scheduled shut-down of the power generation system, or an abnormality of one or more internal components of the power generation system may lead to a reduction in the electrical current generated by the fuel-cell. Consequently, the amount of water or steam generated by the fuel-cell may also decrease. Accordingly, in these instances, when the amount of water or steam generated by the fuel-cell is lower than a determined amount, the amount of carbon deposited on the anode of the fuel-cell also increases. This situation may cause further degradation of the anode that may in turn lead to reduction in the efficiency of the traditional power generation systems.

In order to minimize or avoid the degradation of the anode and the improve the efficiency of the fuel-cell 102, the power generation system 100 of FIG. 1 includes the control sub-system 104. In accordance with the aspects of the present specification, the control sub-system 104 is configured to operate the power generation system 100 such that a ratio of an amount of the steam to an amount of carbon generated by the fuel-cell 102 is maintained above a threshold steam-carbon ratio value. It may be noted that the ratio of the amount of the steam to the amount of carbon generated by the fuel-cell 102 may be referred to as a steam-carbon ratio. In a non-limiting example, the threshold steam-carbon ratio may have a value of 2.5. In another non-limiting example, the threshold steam-carbon ratio may have a value of 3. In yet another non-limiting example, the threshold steam-carbon ratio may have a value in a range from about 2.5 to about 3. In some embodiments, the threshold steam-carbon ratio value may be stored in a memory device (not shown) disposed internally or coupled to the controller 114. Moreover, in certain embodiments, the threshold steam-carbon ratio value may be customizable by an operator of the power generation system 100.

As previously noted, the control sub-system 104 includes the switch 110, the sensor 112, and the controller 114. The switch 110 is electrically coupled between the fuel-cell 102 and the auxiliary load 106. More particularly, the switch 110 is electrically coupled between an output power port 116 of the fuel-cell 102 and the auxiliary load 106. In some embodiments, as depicted in FIG. 1, the sensor 112 may be disposed on an electrical path between the output power port 116 of the fuel-cell 102 and the switch 110. The switch 110 may be selectively operated in a conducting state or a non-conducting state by the controller 114. The switch 110, when operated in the conducting state, allows an electrical current to flow therethrough. However, the switch 110, when operated in the non-conducting state, blocks a flow of the electrical current therethrough. The switch 110 may be an electrically controllable switch such as a semiconductor switch. Non-limiting examples of the semiconductor switch may include transistors, gate commutated thyristors, field effect transistors (FETs), insulated gate bipolar transistors (IGBTs), gate turn-off thyristors (GTOs), static induction transistors, static induction thyristors, or combinations thereof. Moreover, materials used to form the semiconductor switches may include, but are not limited to, silicon (Si), silicon carbide (SiC), gallium nitride (GaN), or combinations thereof. Further, while the control sub-system 104 having single switch 110 is depicted in FIG. 1, use of more than one switch is also contemplated within the purview of the present specification (see FIGS. 2 and 3).

The sensor 112 may be coupled to the fuel-cell 102 and configured to generate an electrical signal indicative of an electrical current generated by the fuel-cell 102. In a non-limiting example, the sensor 112 may be a current sensor. In some embodiments, the sensor 112 may be directly coupled to the output power port 116 of the fuel-cell 102. In some other embodiments, the sensor 112 may be coupled to the a direct-current (DC) link (see FIG. 2). The DC-link is in turn coupled to the output power port 116 of the fuel-cell 102. The electrical current generated by the fuel-cell 102 flows though the DC-link. Therefore, in certain embodiments, the electrical signal generated by the sensor 112 is indicative of a DC current flowing though the DC-link.

Furthermore, as depicted in FIG. 1, the controller 114 is operatively coupled to the sensor 112 and the switch 110. The controller 114 may include a specially programmed general-purpose computer, an electronic processor such as a microprocessor, a digital signal processor, and/or a microcontroller. Further, the controller 114 may include input/output ports, and a storage medium, such as an electronic memory. Various examples of the microprocessor include, but are not limited to, a reduced instruction set computing (RISC) architecture type microprocessor or a complex instruction set computing (CISC) architecture type microprocessor. The microprocessor may be a single-core type or multi-core type. Alternatively, the controller 114 may be implemented as hardware elements such as circuit boards with processors or as software running on a processor such as a personal computer (PC), or a microcontroller.

During operation of the power generation system 100, the fuel-cell 102 generates the electrical current. The sensor 112 generates the electrical signal that is indicative of the electrical current generated by the fuel-cell 102. Further, the controller 114 is configured to receive the electrical signal from the sensor 112.

It may be noted that in certain situations the fuel-cell 102 may experience a water deficient condition. The water deficient condition of the fuel-cell 102 refers to a state of the fuel-cell 102 when the steam-carbon ratio in the fuel-cell 102 is lower than the threshold steam-carbon ratio value. The water deficient condition of the fuel-cell 102 may be caused due to one or more of a loss or disconnection of the external load 108 from the power generation system 100, a premature shut-down of the power generation system 100, a scheduled shut-down of the power generation system 100, or an abnormality of one or more internal components of the power generation system 100. In the water deficient condition, the steam-carbon ratio in the fuel-cell 102 falls to the value that is lower than the threshold steam-carbon ratio value. In accordance with aspects of the present specification, the controller 114 is configured to detect the water deficient condition of the fuel-cell 102 based on the electrical signal received from the sensor 112 and a predefined current threshold value. Details of steps performed by the controller 114 to detect the water deficient condition of the fuel-cell 102 will be described in conjunction with FIG. 5.

If the water deficient condition of the fuel-cell 102 is detected, the controller 114 is configured to operate the auxiliary load 106 of the power generation system 100 via use of the electrical current generated by the fuel-cell 102. In particular, the controller 114 is configured to operate the switch 110 in the conducting state to operate the auxiliary load 106 via use of the electrical current generated by the fuel-cell 102. In one embodiment, the controller 114 may operate the switch 110 in the conducting state by communicating a control signal to the switch 110. When operated in the conducting state, the switch 110 electrically connects the auxiliary load 106 with the fuel-cell 102.

Moreover, the controller 114 is configured to operate the auxiliary load 106 via the electrical current generated by the fuel-cell 102 to maintain the steam-carbon ratio in the fuel-cell 102 above the threshold steam-carbon ratio value. In some embodiments, when the switch 110 is operated in the conducting state to connect the auxiliary load 106 with the fuel-cell 102, the auxiliary load 106 draws the electrical current from the fuel-cell 102. The current drawn by the auxiliary load 106 in turn causes the fuel-cell 102 to generate more electrical current in comparison to the electrical current generated prior to operating the switch 110 in the conducting state. As the amount of electrical current generated by the fuel-cell 102 increases, the amount of water generated by the fuel-cell also increases leading to an increase in the steam-carbon ratio in the fuel-cell 102. Advantageously, operating the fuel-cell 102 when the steam-carbon ratio in the fuel-cell 102 is above the threshold steam-carbon ratio value improves lifetime and efficiency of the fuel-cell 102. The controller 114 will be described in greater detail with reference to FIGS. 4-6.

Figure 2:
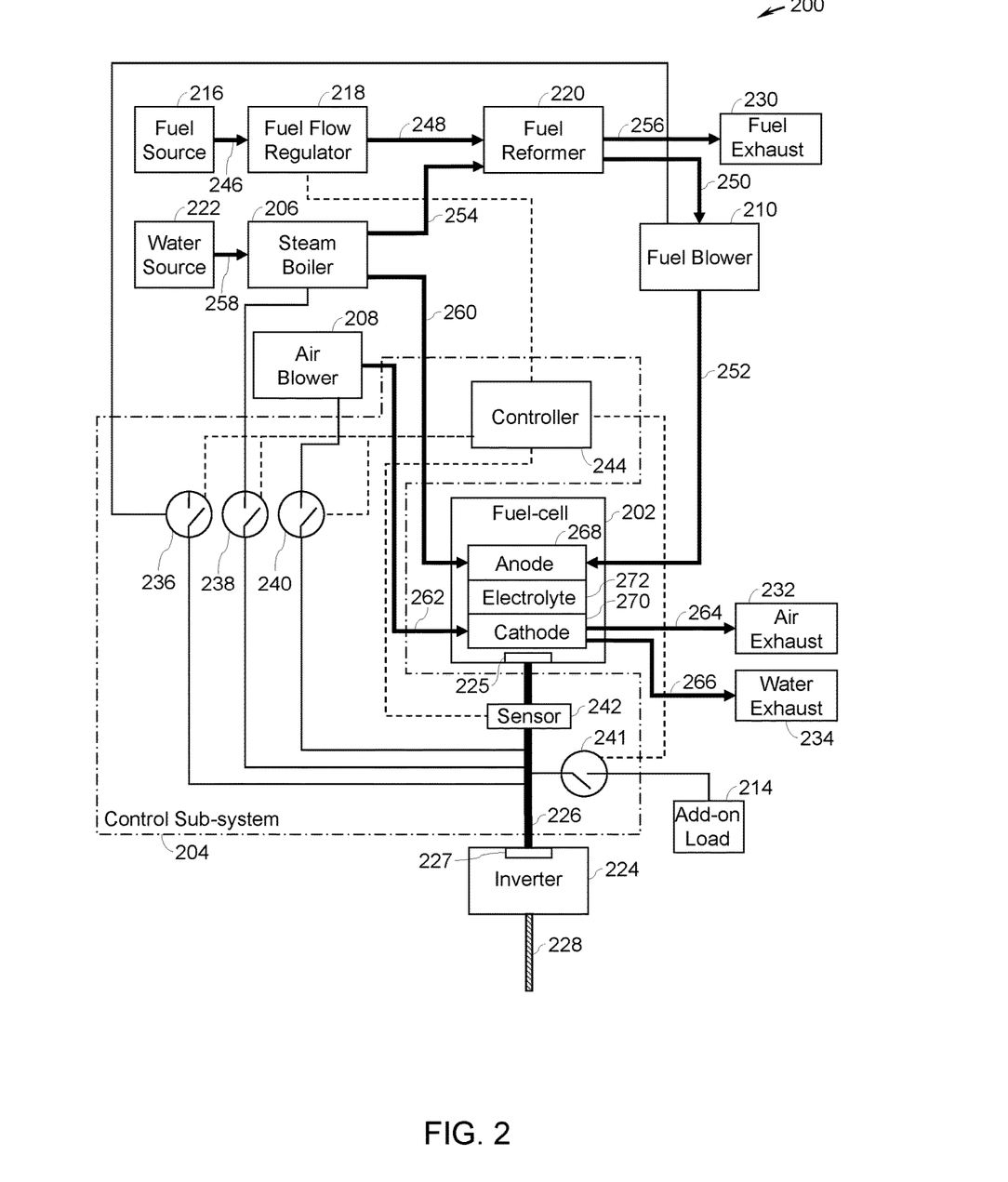
FIG. 2 is a block diagram of a power generation system, in accordance with another aspect of the present specification.

FIG. 2 is a block diagram of a power generation system 200, in accordance with another aspect of the present specification. The power generation system 200 may be representative of one embodiment of the power generation system 100 of FIG. 1. In some embodiments, the power generation system 200 may include one or more of a fuel-cell 202, a control sub-system 204, and at least one auxiliary load such as a steam boiler 206, an air blower 208, a fuel blower 210, an add-on load 214, or combinations thereof. The power generation system 200 may also include a fuel source 216, a fuel flow regulator 218, a fuel reformer 220, a water source 222, an inverter 224, a direct-current (DC) link 226, an alternating-current (AC) link 228, a fuel exhaust 230, an air exhaust 232, and a water exhaust 234. The control sub-system 204 may include one or more switches such as switches 236, 238, 240, 241, a sensor 242, and a controller 244.

The fuel source 216 is fluidly coupled to the fuel flow regulator 218 via a conduit 246. Further, the fuel flow regulator 218 is fluidly coupled to the fuel reformer 220 via a conduit 248. Furthermore, the fuel reformer 220 is fluidly coupled to the fuel blower 210 via a conduit 250, and to the fuel exhaust 230 via a conduit 256. Moreover, the fuel blower 210 is fluidly coupled to the fuel-cell 202 via the conduit 252. Additionally, the water source 222 is fluidly coupled to the steam boiler 206 via a conduit 258. Further, the steam boiler 206 is fluidly coupled to the fuel reformer 220 via a conduit 254 and to the fuel-cell 202 via a conduit 260. Moreover, the air blower 208 is fluidly coupled to the fuel-cell 202 via a conduit 262. The fuel-cell 202 is also fluidly coupled to the air exhaust 232 and the water exhaust 234 respectively via conduits 264 and 266. Arrows along the conduits 246-266 represent a direction of a flow of the fluid flowing therethrough.

Moreover, the fuel source 216 may be representative of a reservoir, tank, or a pipeline of a fuel that receives the fuel from external sources and supplies the fuel for use in the power generation system 200. The fuel may include may include a hydrocarbon gas. In a non-limiting example, the hydrocarbon gas includes a natural gas. Other fuels including, but not limited to, any gas or liquid may also be used in the fuel stream, without limiting the scope of the present specification. Non-limiting examples of other fuels may include methane, ethane, propane, biogas, syngas, diesel, kerosene, gasoline, jet fuel such as Jet Propellant-8 (JP-8), or combinations thereof.

Also, the fuel flow regulator 218 may be configured to receive the fuel from the fuel source 216 and regulate a flow rate of the fuel supplied to the fuel reformer 220 under the control of the control sub-system 204. The fuel reformer 220 facilitates a chemical reaction between the fuel received from the fuel flow regulator 218 and steam received from the steam boiler 206. As a result of the chemical reaction, the fuel reformer 220 produces hydrogen and a by-product, for example, carbon-dioxide and water. The hydrogen generated by the fuel reformer 220 is supplied to the fuel-cell 202 via the fuel blower 210. Moreover, the by-product of the chemical reaction may be supplied to the fuel exhaust 230 from the fuel reformer 220.

Furthermore, the water source 222 may be representative of a reservoir, tank, or a pipeline of water that receives water from external sources and supplies the water for use in the power generation system 200. The steam boiler 206 is configured to receive the water from the water source 222 and heat the water to generate steam. In some embodiments, the steam boiler 206 may also be a heat exchanger which recuperates heat from hot fuel stream, hot air stream, or both. Further, the steam is also supplied to the fuel reformer 220 via the conduit 254. Moreover, the air blower 208 is configured to supply air/oxygen to the fuel-cell 202 via the conduit 262. In certain embodiments, the air blower 208 may also be configured to provide an adequate supply of air to the fuel-cell 202 to control temperature of the fuel-cell 202 and/or to aid in chemical reactions in the fuel-cell 102.

Moreover, the fuel-cell 202 typically includes an anode 268, a cathode 270, and an electrolyte 272 disposed between the anode 268 and the cathode 270. The anode 268 receives the steam from the steam boiler 206 via the conduit 260 and the hydrogen from the fuel blower 210 via the conduit 252. The cathode 270 receives air/oxygen from the air blower 208 via the conduit 262. The fuel-cell 202 may generate the electrical power including an electrical current and an electrical voltage based on an electrochemical reaction between the hydrogen and oxygen, in some embodiments. In some other embodiments, the fuel-cell 202 may generate the electrical power based on a chemical reaction between hydrogen, steam, oxygen, and carbon monoxide (CO). In yet another embodiment, the fuel-cell 202 may generate the electrical power based on a chemical and electrochemical reaction between hydrogen, steam, oxygen, methane, and CO.

The cathode 270 in the fuel-cell 202 facilitates reduction reactions to generate negatively charged oxygen ions from the air supplied to the cathode 270. In certain embodiments, the fuel-cell 202, typically operating at a temperature between 750° C. and 850° C., enables the transport of the negatively charged oxygen ions from the cathode 270 to the anode 268 via the electrolyte 272. Simultaneously, electrons may travel from the anode 268 to the cathode 270 via a separate electrical path. This flow of the electrons constitutes a direct current (DC) electrical power. Moreover, at the anode 268, the negatively charged oxygen ions may combine with either free hydrogen or hydrogen in a hydrocarbon molecule to form water vapor and/or the negatively charged oxygen ions may combine with carbon monoxide to form carbon dioxide. The water from the fuel-cell 202 may be discharged to the water exhaust 234 via the conduit 266. Additionally, the air supplied to the fuel-cell 202 may be discharged to the air exhaust 232 via the conduit 264.

Also, the DC link 226 that is operatively coupled to the fuel-cell 202 aids in transmitting the electrical current from the fuel-cell 202 to the inverter 224. In particular, the DC-link 226 is electrically coupled between the fuel-cell 202 and the inverter 224. More specifically, the DC-link 226 electrically connects an output power port 225 of the fuel-cell 202 with an input power port 227 of the inverter 224 and supplies the DC electrical current/power generated by the fuel-cell 202 to the inverter 224. Moreover, in a non-limiting example, the sensor 242 is electrically connected the DC-link 226 at a location between the output power port 225 of the fuel-cell 202 and the input power port 227 of the inverter 224. The DC-link 226 may include two conductors (not shown), where one conductor is maintained at a positive potential and another conductor is maintained at a negative potential. In certain embodiments, the DC-link 226 may also include a capacitor (not shown) electrically coupled between the two conductors of the DC-link 226.

The inverter 224 may be a DC to AC power converter. In some embodiments, the inverter 224 may include an electronic circuit that includes an arrangement of semiconductor switches configured to convert the DC electrical power into an AC electrical power, for example, a single-phase or three-phase electrical power. The AC-link 228 may be electrically coupled to an output power port of the inverter 224. The AC-link 228 may be a single-phase AC-link or a three-phase AC-link. The AC electrical power from the inverter 224 may be supplied to one or more external loads (not shown) via the AC-link 228.

During operation of the power generation system 200, various conditions including, but not limited to, a loss or disconnection of an external load from the power generation system 200, a premature shut-down of the power generation system 200, a scheduled shut-down of the power generation system 200, or an abnormality of one or more internal components of the power generation system 200, may lead to drop in the electrical current/power generated by the fuel-cell 202. Accordingly, in these instances, there may be a reduction in the amount of water or steam generated by the fuel-cell 202. If the amount of water or steam generated by the fuel-cell 202 falls below a determined amount, the steam-carbon ratio in the fuel-cell 202 may also fall below the threshold steam-carbon ratio. Operation of the fuel-cell 202 at the steam-carbon ratio below the threshold steam-carbon ratio may cause degradation of the anode 268 leading to a reduction in the efficiency of the fuel-cell 202. In accordance with aspects of the present specification, the control sub-system 204 of the power generation system 200 is configured to operate the power generation system 200 such that the steam-carbon ratio in the fuel-cell 202 is maintained above the threshold steam-carbon ratio, thereby mitigating the adverse effects caused due to the drop in the electrical current.

The control sub-system 204 of FIG. 2 represents one embodiment of the control sub-system 104 of FIG. 1 and includes similar components. For example, the switches 236-240, 241, the sensor 242, and the controller 244 are similar to the respective components of FIG. 1. In particular, the switch 236 is connected between the DC-link 226 and the fuel blower 210, the switch 238 is connected between the DC-link 226 and the steam boiler 206, the switch 240 is connected between the DC-link 226 and the air blower 208, and the switch 241 is connected between the DC-link 226 and the add-on load 214. Moreover, the sensor 242 is electrically connected to the fuel-cell 202. As shown in the embodiment of FIG. 2, the sensor 242 is electrically connected to the fuel-cell 202 via DC-link 226 and configured to generate an electrical signal that is indicative of the electrical current generated by the fuel-cell 202.

The controller 244 is operatively coupled to the switches 236-241 and the sensor 242. The controller 244 may be configured to receive the electrical signal from the sensor 242. In accordance with aspects of the present specification, the controller 244 is configured to detect the water deficient condition of the fuel-cell 202 based on the electrical signal received from the sensor 244 and a predefined current threshold value. Details of steps performed by the controller 244 to detect the water deficient condition of the fuel-cell 202 will be described in conjunction with FIG. 5.

If the water deficient condition is detected, the controller 244 is configured to selectively operate one or more of the auxiliary load such as the steam boiler 206, the air blower 208, the fuel blower 210, the add-on load 214, via use of the electrical current generated by the fuel-cell 202 to maintain the steam-carbon ratio in the fuel-cell 202 above the threshold steam-carbon ratio value. To operate the auxiliary loads 206, 208, 210, 214 via use of the electrical current generated by the fuel-cell 202, the controller 244 may selectively operate the switches 236-241 in the conducting state by communicating control signals to the switches 236-241. When operated in the conducting state, the switches 236-241 electrically connect the auxiliary loads 206, 208, 210, 214 to the fuel-cell 102 such that the auxiliary loads 206, 208, 210, 214 draw the electrical current from the fuel-cell 202.

Moreover, when the water deficient condition is detected, the controller 244 may be configured to operate the air blower 208 to control temperature of the fuel-cell 202 and to facilitate the reduction reactions in the fuel-cell 202. Furthermore, when the water deficient condition is detected, the controller 244 may be configured to operate the fuel blower 210 to provide adequate hydrogen content to the anode 268. The controller 244 will be described in greater detail in conjunction with FIGS. 4-6.

When the controller 244 selectively operates the switches 236-241 in the conducting state, the auxiliary loads 206, 208, 210, 214 draw the electrical current from the fuel-cell 202. The current drawn by the auxiliary loads 206, 208, 210, 214 in turn causes the fuel-cell 202 to generate more electrical current in comparison to the electrical current that was generated prior to operating the auxiliary loads 206, 208, 210, 214 via the use of the electrical current generated by the fuel-cell 202. As the amount of electrical current generated by the fuel-cell 202 increases, the amount of water generated by the fuel-cell 202 also increases. The increase in the amount of water generated by the fuel-cell 202 leads to an increase in the steam-carbon ratio in the fuel-cell 202. Advantageously, the operation of the fuel-cell 202 when the steam-carbon ratio in the fuel-cell 202 is above the threshold steam-carbon ratio value, improves lifetime and efficiency of the fuel-cell 202.

Figure 3:
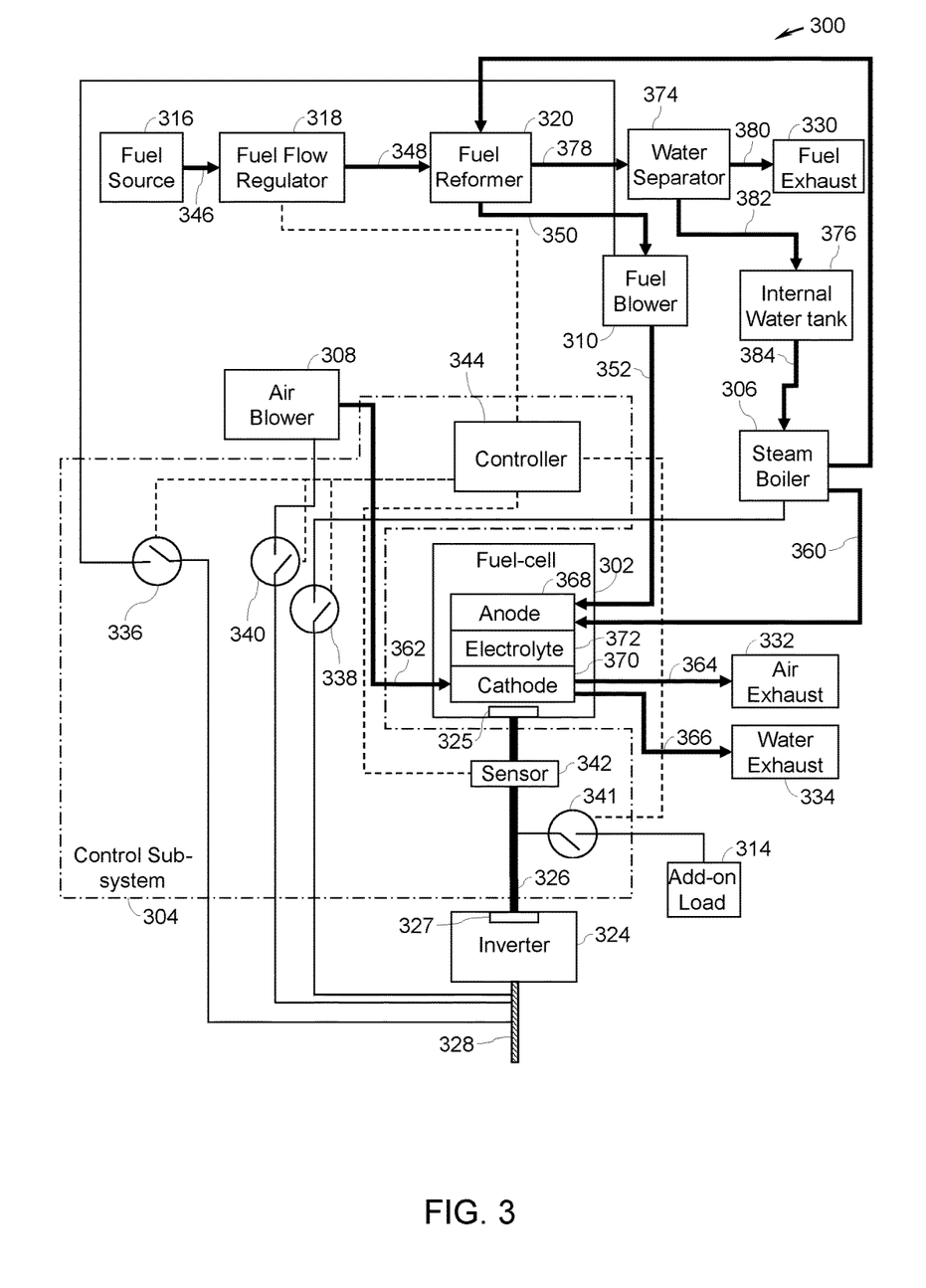
FIG. 3 is a block diagram of a power generation system, in accordance with yet another aspect of the present specification.

FIG. 3 is a block diagram of a power generation system 300, in accordance with yet another aspect of the present specification. The power generation system 300 of FIG. 3 represents one embodiment of the power generation system 200 of FIG. 2. Various components of the power generation system 300 are similar to corresponding components of the power generation system 200 of FIG. 2. The power generation system 300 of FIG. 3 includes one or more of a fuel-cell 302, a control sub-system 304, and at least one auxiliary load such as a steam boiler 306, an air blower 308, a fuel blower 310, an add-on load 314, or combinations thereof. The power generation system 300 may include a fuel source 316, a fuel flow regulator 318, a fuel reformer 320, an inverter 324, a DC-link 326, an AC-link 328, a fuel exhaust 330, an air exhaust 332, and a water exhaust 334. The control sub-system 304 may include one or more switches such as switches 336, 338, 340, 341, a sensor 342, and a controller 344. Furthermore, the power generation system 300 includes conduits 346, 348, 350, 352, 360, 362, 364, and 366. The fuel-cell 302 includes an anode 368, a cathode 370, and an electrolyte 372. Moreover, the reference numerals 325 and 327 may respectively represent an output power port of the fuel-cell 302 and an input power port of the inverter 324.

It may be noted that power generation system 300 of FIG. 3 does not include a water source such as the water source 222 (see FIG. 2) that receives water from outside the power generation system. However, the power generation system 300 includes a water separator 374 and an internal water tank 376. The water separator 374 is fluidly coupled to the fuel reformer 320 via a conduit 378 and to the fuel exhaust 330 via a conduit 380. In certain embodiments, an optional cooler (not shown) or heat exchanger (not shown) may be fluidly coupled between the fuel reformer 320 and the water separator 374 along the conduit 378. The internal water tank 376 is fluidly coupled to the water separator 374 via a conduit 382 and to the steam boiler 306 via a conduit 384.

The water separator 374 receives a fluid including water-vapor, hydrogen, methane, carbon monoxide, and carbon dioxide from the fuel reformer 320 and separates water from the received fluid. Further, the water separator 374 supplies the water to the internal water tank 376 via the conduit 382. The steam boiler 306 receives water from the internal water tank 376 via the conduit 384 and generates steam. The steam boiler 306 supplies the steam to the fuel-cell 302. Moreover, in the embodiment of the power generation system 300, the switches 336, 338, and 340 are coupled to the AC-link 328 and are respectively configured to connect the fuel blower 310, the air blower 308, and the steam boiler 306 to the AC-link 328 or disconnect the fuel blower 310, the air blower 308, and the steam boiler 306 from the AC-link 328.

Figure 4:
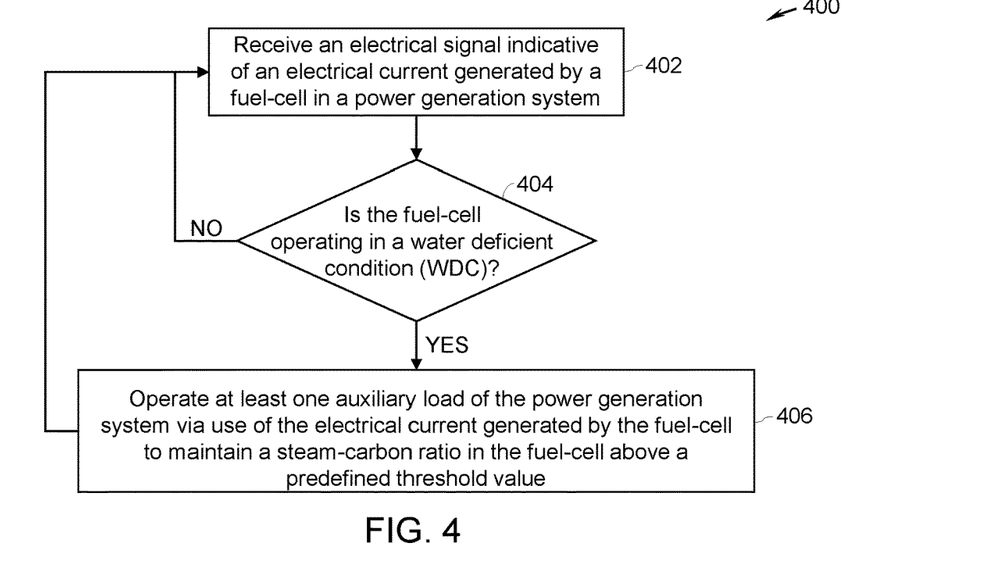
FIG. 4 is a flow diagram of a method for operating the power generation system of any of the systems of FIGS. 1-3, in accordance with aspects of the present specification.

FIG. 4 is a flow diagram 400 of a method for operating the power generation system of any of the power generation systems depicted in FIGS. 1-3, in accordance with aspects of the present specification. The flow diagram 400 of FIG. 4 is described in conjunction with the power generation system 100 of FIG. 1. It may be noted that the method of FIG. 4 is also applicable to the power generation systems 200, 300 of FIGS. 2 and 3.

At step 402, the controller 114 is configured to receive an electrical signal indicative of an electrical current generated by the fuel-cell 102 in the power generation system 100. The controller 114 receives the electrical signal indicative of an electrical current generated by the fuel-cell 102 from the sensor 112. Further, at step 404, the controller 114 is configured to perform a check to detect whether the fuel-cell 102 is operating in a water deficient condition (WDC). In some embodiments, the controller 114 may detect that the fuel-cell 102 is operating in the water deficient condition based on the electrical signal received at step 402. The detection of the fuel-cell 102 operating in the water deficient condition will be described in conjunction with FIG. 5.

If at step 404 it is determined that the fuel-cell 102 is operating in the water deficient condition, the controller 114, is configured to operate the auxiliary load 106 of the power generation system 100 via use of the electrical current generated by the fuel-cell 102 to maintain the steam-carbon ratio in the fuel-cell 102 above a threshold steam-carbon ratio value, as indicated by step 406. In a non-limiting example, the threshold steam-carbon ratio may have a value of 2.5. In another non-limiting example, the threshold steam-carbon ratio may have a value of 3. In yet another non-limiting example, the threshold steam-carbon ratio may have a value in a range from about 2.5 to about 3. In some embodiments, the threshold steam-carbon ratio value may be stored in the memory device disposed internally or coupled to the controller 114. Moreover, in certain embodiments, the threshold steam-carbon ratio value may be customizable by an operator of the power generation system 100.

Figure 5:
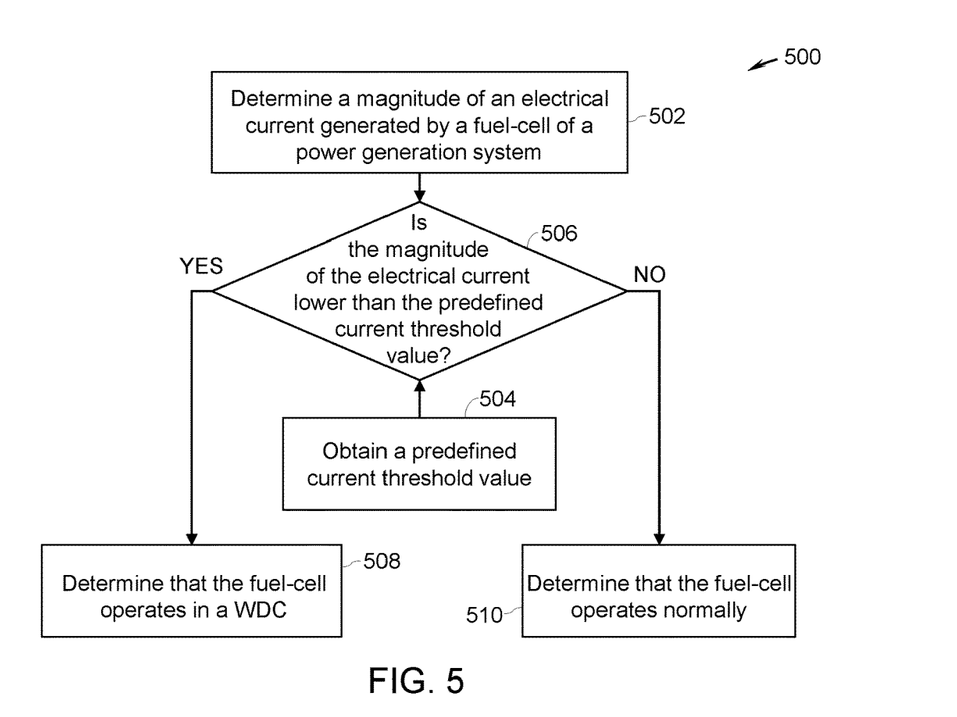
FIG. 5 is a flow diagram of a method for detecting a water deficient condition of a fuel-cell used in any of the systems of FIGS. 1-3, in accordance with aspects of the present specification.

Referring now to FIG. 5, a flow diagram 500 of a method for detecting a water deficient condition of the fuel-cell used in any of the power generation systems depicted in FIGS. 1-3, in accordance with aspects of the present specification, is presented. In some embodiments, the flow diagram 500 of FIG. 5 may represent sub-steps of step 404 of FIG. 4. The flow diagram 500 of FIG. 5 is described in conjunction with the power generation system 100 of FIG. 1. It may be noted that the method of FIG. 5 is also applicable to the power generation systems 200, 300 of FIGS. 2 and 3.

At step 502, the controller 114 is configured to determine a magnitude of the electrical current generated by the fuel-cell 102 of the power generation system 100. In some embodiments, the magnitude of the electrical signal received from the sensor 112 may be representative of the magnitude of the electrical current generated by the fuel-cell 102. Therefore, the controller 114 may determine the magnitude of the electrical current generated by the fuel-cell 102 based on the magnitude of the electrical signal received from the sensor 112.

Further, at step 504, the controller 114 may obtain a threshold current value from a memory device associated with the controller 114. In some embodiments, the threshold current value may be representative of a magnitude of the electrical current corresponding to the threshold steam-carbon ratio value. In certain embodiments, the controller 114 may be configured to determine the threshold current value and store the threshold current value in the memory device for use by the controller 114. The controller 114 may be configured to determine the threshold current value based on the threshold steam-carbon ratio value, a temperature of the fuel-cell 102, a flowrate of a fuel to the fuel-cell 102, a flowrate of steam to the fuel-cell 102, or combinations thereof. By way of example, the controller 114 may use a mathematical model, a physics based model, a look-up table, or combinations thereof, to determine the threshold current value using the threshold steam-carbon ratio value, the temperature of the fuel-cell 102, the flowrate of the fuel to the fuel-cell 102, the flowrate of steam to the fuel-cell 102, or combinations thereof.

Moreover, at step 506, the controller 114 may be configured to perform a check to determine whether the magnitude of the electrical current generated by the fuel-cell 102 is lower than the predefined current threshold value by comparing the magnitude of the electrical current with the predefined current threshold value. At step 506, if it is determined that the magnitude of the electrical current generated by the fuel-cell 102 is lower than the predefined current threshold value, the controller 114, is configured to determine that the fuel-cell 102 is operating in the water deficient condition, as indicated by step 508. However, at step 506, if it is determined that the magnitude of the electrical current generated by the fuel-cell 102 is greater than or equal to the predefined current threshold value, the controller 114, is configured to determine that the fuel-cell 102 is operating normally without any water deficient condition.

Figure 6:
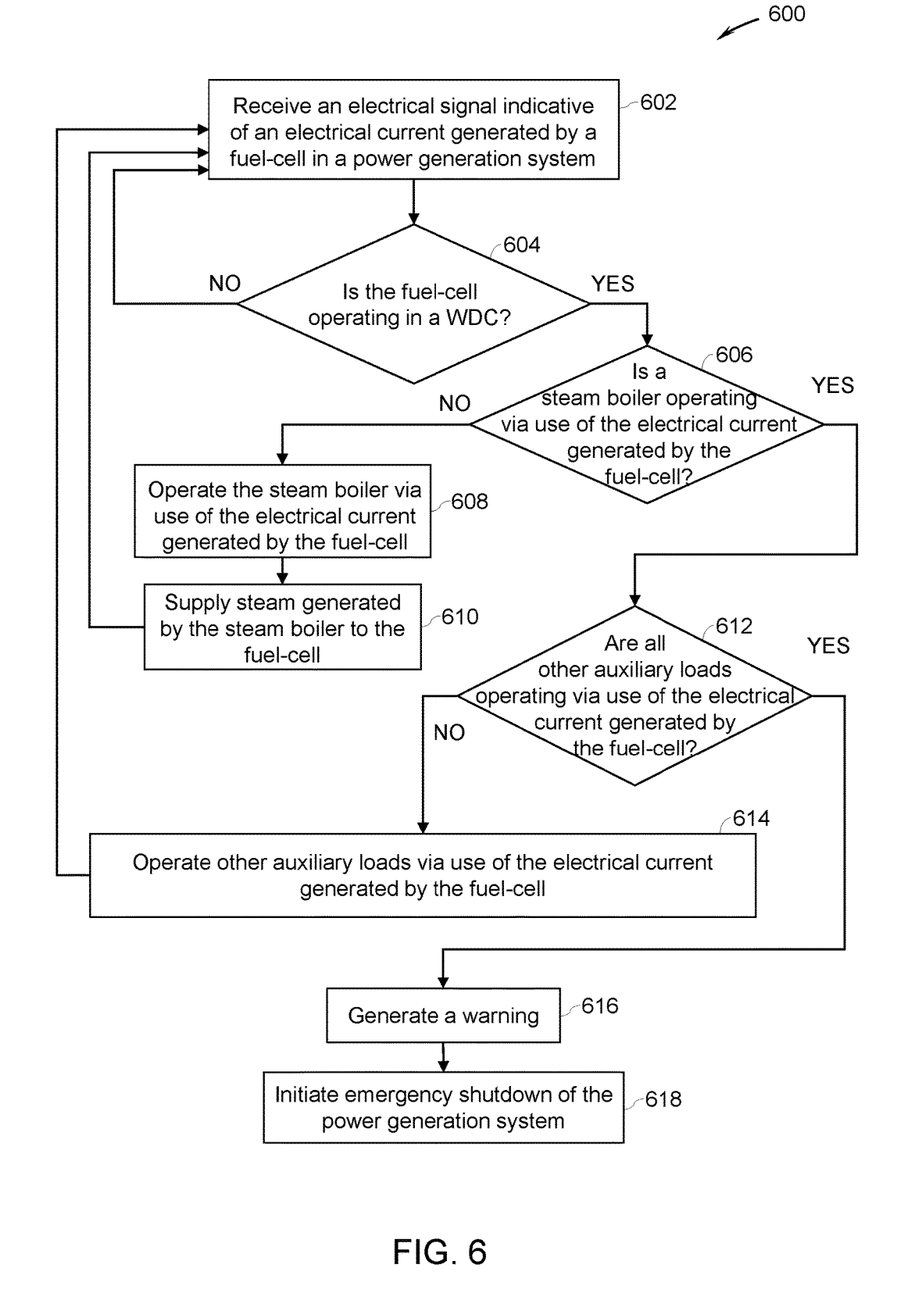
FIG. 6 is a flow diagram of a method for operating the power generation system of any of the systems of FIGS. 2 and 3, in accordance with aspects of the present specification.

FIG. 6 is a flow diagram 600 of a method for operating the power generation systems of any of FIGS. 2 and 3, in accordance with aspects of the present specification. The flow diagram 600 is described with reference to the power generation system 200 of FIG. 2. It may be noted that the method of FIG. 6 may also be applicable to the power generation system 300 of FIG. 3.

At step 602, the controller 244 is configured to receive an electrical signal indicative of an electrical current generated by the fuel-cell 202 in the power generation system 200. The controller 244 receives the electrical signal indicative of an electrical current generated by the fuel-cell 202 from the sensor 242. Further, at step 604, the controller 244 is configured to perform a check to detect whether the fuel-cell 202 is operating in the water deficient condition. In some embodiments, the controller 244 may detect whether the fuel-cell 202 is operating in the water deficient condition based on the electrical signal received at step 602. The method of detecting whether the fuel-cell 202 is operating in the water deficient condition has been described in conjunction with FIG. 5.

At step 604, if it is determined that the fuel-cell 202 is not operating in the water deficient condition, control is returned to step 602 and steps 602 and 604 are executed. However, at step 604, if it is determined that the fuel-cell 202 is operating in the water deficient condition, the controller 244 is configured to perform another check at step 606.

At step 606, the controller 244 is configured to determine whether the steam boiler 206 is operating via use of the electrical current generated by the fuel-cell 202. At step 606, if it is determined that the steam boiler 206 is not operating via use of the electrical current generated by the fuel-cell 202, the controller 244 is configured to operate the steam boiler 206 via use of the electrical current generated by the fuel-cell 202, as indicated by step 608. Operating the steam boiler 206 via use of the electrical current generated by the fuel-cell 202 causes the electrical current to be drawn from the fuel-cell 202 for use by the steam boiler 206 to generate steam. This additional current drawn by the steam boiler 206 in turn causes generation of additional current by the fuel-cell 202. In some embodiments, to operate the steam boiler 206, the controller 244 may be configured to couple the steam boiler 206 to the DC-link 226 by operating the switch 238 in the conducting state. In some embodiments, to operate the steam boiler 306, the controller 344 may be configured to couple the steam boiler 306 to the AC-link 328 by operating the switch 338 in the conducting state (see FIG. 3).

At step 610, the steam generated by the steam boiler 206 is supplied to the fuel-cell 202. This supply of steam to the fuel-cell 202 from the steam boiler 206 further aids in increasing the steam-carbon ratio in the fuel-cell 202. Subsequently, control is returned to step 602 and steps 602 and 604 are executed.

With returning reference to step 606, if it is determined that the steam boiler 206 is already operating via use of the electrical current generated by the fuel-cell 202, the controller 244 is configured to perform another check at step 612. At step 612, the controller 244 is configured to determine whether all other auxiliary loads 208, 210, 214 are operating via use of the electrical current generated by the fuel-cell 202. If it is determined that all other auxiliary loads 208, 210, 214 are not operating via use of the electrical current generated by the fuel-cell 202, the controller 244 is configured to operate all other auxiliary loads 208, 210, 214 via use of the electrical current generated by the fuel-cell 202, as indicated by step 614. In some embodiments, to operate the auxiliary loads 208, 210, 214, the controller 244 may be configured to connect the auxiliary loads 208, 210, 214 to the DC-link 226 by operating the switches 240, 236, 241 in the conducting state. In certain embodiments, to operate the auxiliary loads 308, 310, the controller 344 may be configured to connect the auxiliary loads 308, 310 to the AC-link 328 by operating the switches 340, 336 in the conducting state (see FIG. 3).

In some embodiments, at step 614, the auxiliary loads 208, 210, 214 may be operated in two phases. For example, in a first phase, the auxiliary loads 208 and 210 are operated via use of the electrical current generated by the fuel-cell 202. In a second phase, the add-on load 214 may be operated after operating the auxiliary loads 208 and 210 if the controller 244 determines that the electrical current generated by the fuel-cell 202 is insufficient to maintain the steam-carbon ratio in the fuel-cell 202 above the threshold steam-carbon value.

Operation of the other auxiliary loads 208, 210, 214 causes further increase in the amount of the electrical current generated by the fuel-cell 202, thereby increasing generation of water by the fuel-cell 202. Hence, the steam-carbon ratio in the fuel-cell 202 may further be increased. After step 614 is performed, control is returned to step 602.

Referring again to step 612, if it is determined that all other auxiliary loads 208, 210, 214 are operating via use of the electrical current generated by the fuel-cell 202, the controller 244 may determine that no further current can be generated by the fuel-cell 202 using all the auxiliary loads 206, 208, 210, 214. Accordingly, at step 612, if it is determined that all other auxiliary loads 208, 210, 214 are operating via use of the electrical current generated by the fuel-cell 202, the controller 244 may be configured to generate a warning, as indicated by step 616. In some embodiments, the warning may be in the form of an alarm, a visual indicator such as light or display, a wired and/or wireless communication to an operator of the power generation system 200, or combinations thereof. Further, at step 618, in some embodiments, the controller 244 may initiate an emergency shutdown of the power generation system 200. During the emergency shutdown of the power generation system 200, the operation of all of the components of the power generation system 200 may be suspended.

Figure 7:
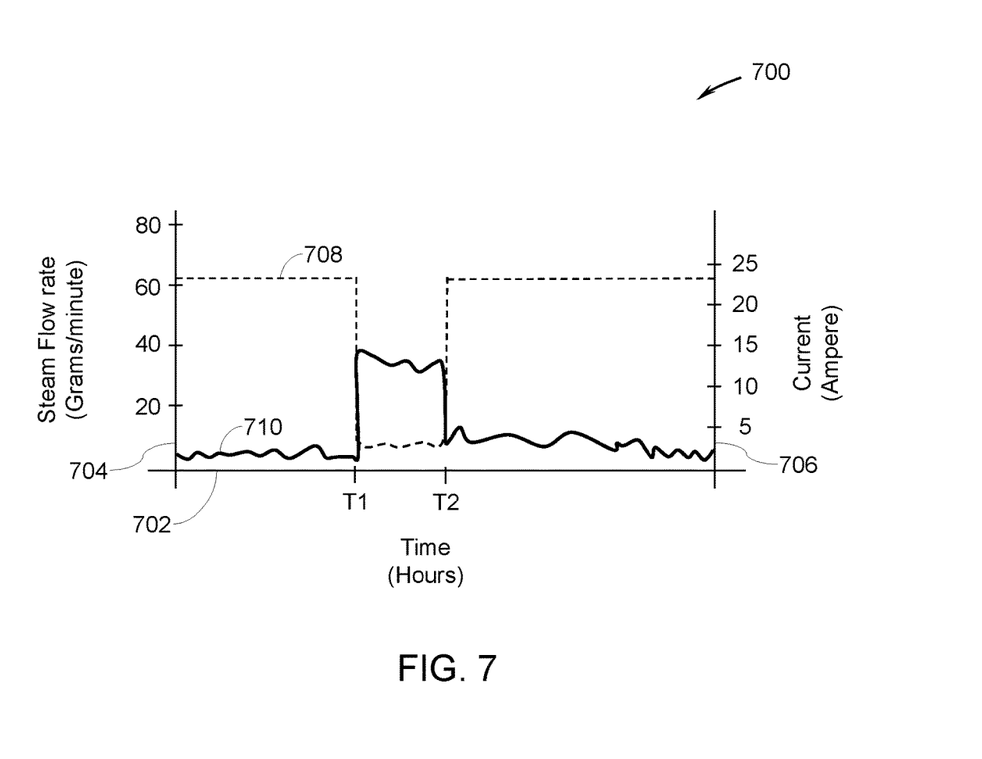
FIG. 7 is a graphical representation depicting a current generated by a fuel-cell and a flowrate of steam generated by a steam boiler used in the power generation system of FIG. 2, in accordance with aspects of the present specification.

FIG. 7 is a graphical representation 700 depicting a current generated by the fuel-cell 202 and a flowrate of the steam generated by the steam boiler 206 used in the power generation system 200 of FIG. 2, in accordance with a non-limiting example of the present specification. In the graphical representation 700 of FIG. 7, reference numerals 702, 704, and 706 represent an X-axis, a first Y-axis, and a second Y-axis, respectively. Moreover, the current generated by the fuel-cell 202 is represented using a dashed line identified by reference numeral 708 and the flowrate of the steam generated by the steam boiler 206 is represented by a solid line identified by reference numeral 710. Time T1 represents a time at which the controller 244 determines that the fuel-cell 202 is operating in a water deficient condition, as indicated at step 604 of FIG. 6. Moreover, time T2 represents a time at which the water deficient condition of the fuel-cell 202 no longer exists. For example, the time T2 may represent a time at which the problem that caused the water deficient condition in the fuel-cell 202 has been resolved.

As depicted in the FIG. 7, during the time period T1-T2 when the fuel-cell 202 is operating in the water deficient condition, the flowrate 710 of the steam generated by the steam boiler 206 is greater in comparison to any other time before the time T1 and after the time T2. Advantageously, in some embodiments, the increased flowrate 710 of the steam during the time period T1-T2 leads to an increased supply of the steam to the fuel-cell 202, thereby maintaining the steam-carbon ratio in the fuel-cell 202 above the threshold steam-carbon ratio value even in the event of the water deficient condition.

In accordance with some aspects of the present specification, configurations of the power generation system 100, 200, 300 exhibit certain advantages over traditional fuel-cell based power generation systems. In the power generation system 100, 200, 300, the steam-carbon ratio is maintained above the threshold steam-carbon ratio value even in the event of the water deficient condition. Accordingly, there exists an adequate amount of the steam/water in the fuel-cell 102, 202, 302 even during the water-deficient conditions of the fuel cell. Advantageously, the deposition of carbon on the anode 268, 368 may be minimized and the degradation of the anode 268, 368 may be minimized. Protecting the anode 268, 368 from the carbon deposition in turn improves the lifetime of the fuel-cell 102, 202, 302. Consequently, the efficiency of the power generation systems 100, 200, 300 is also improved.

This written description uses examples to disclose the invention, including the preferred embodiments, and also to enable any person skilled in the art to practice the invention, including making and using any devices or systems and performing any incorporated methods. The patentable scope of the present specification is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. A method for operating a power generation system comprising a fuel-cell, the method comprising:
   detecting a water deficient condition of the fuel-cell; and
   operating, in response to detecting the water deficient condition of the fuel-cell, at least one auxiliary load of the power generation system via use of an electrical current generated by the fuel-cell to maintain a steam-carbon ratio in the fuel-cell above a threshold steam-carbon ratio value.

2. The method of claim 1, wherein the at least one auxiliary load comprises an internal electrical load of the power generation system.

3. The method of claim 1, wherein detecting the water deficient condition of the fuel-cell comprises determining if a magnitude of the electrical current generated by the fuel-cell is lower than a threshold current value, and wherein the threshold current value corresponds to the electrical current generated by the fuel-cell at the threshold steam-carbon ratio value.

4. The method of claim 3, wherein the at least one auxiliary load comprises a steam boiler, an air blower, fuel blower, an add-on load, or combinations thereof.

5. The method of claim 4, wherein operating the at least one auxiliary load comprises:
  operating the steam boiler and one or more of the air blower, the fuel blower, and the add-on load via use of the electrical current generated by the fuel-cell; and
  supplying steam generated by the steam boiler to the fuel-cell.

6. The method of claim 1, wherein operating the at least one auxiliary load comprises electrically connecting the at least one auxiliary load to the fuel-cell via a direct-current (DC) link operatively coupled to an output power port of the fuel-cell.

7. The method of claim 1, wherein operating the at least one auxiliary load comprises electrically connecting the at least one auxiliary load to the fuel-cell via an alternating-current (AC) link, wherein the AC-link is coupled to an output power port of an inverter of the power generation system, and wherein an input power port of the inverter is coupled to an output power port of the fuel-cell via a DC-link.

8. The method of claim 1, wherein the threshold steam-carbon ratio value is in a range from about 2.5 to about 3.

9. A control sub-system for operating a power generation system, wherein the power generation system comprises a fuel-cell and at least one auxiliary load, the control sub-system comprising:
  a sensor coupled to the fuel-cell and configured to generate an electrical signal indicative of an electrical current generated by the fuel-cell;
  one or more switches coupled between the fuel-cell and the at least one auxiliary load; and
  a controller operatively coupled to the sensor and the one or more switches, wherein the controller is configured to:
    detect a water deficient condition of the fuel-cell based on the electrical signal generated by the sensor; and
    operate, if the water deficient condition is detected, the at least one auxiliary load of the power generation system via use of the electrical current generated by the fuel-cell to maintain a steam-carbon ratio in the fuel-cell above a threshold steam-carbon ratio value.

10. The control sub-system of claim 9, wherein the water deficient condition is caused due to a loss of an external load, a premature shut-down of the power generation system, a scheduled shut-down of the power generation system, or an abnormality of one or more internal components of the power generation system, or combinations thereof.

11. The control sub-system of claim 9, wherein the one or more switches are coupled to the fuel-cell via a direct-current (DC) link or an alternating-current (AC) link.

12. The control sub-system of claim 9, wherein to operate the at least one auxiliary load of the power generation system via use of the electrical current generated by the fuel-cell, the controller is configured to operate the one or more switches in a conducting state.

13. The control sub-system of claim 9, wherein the at least one auxiliary load comprises an internal electrical load of the power generation system.

14. The control sub-system of claim 9, wherein the at least one auxiliary load comprises a steam boiler, an air blower, a fuel blower, a fuel flow regulator, an add-on load, or combinations thereof.

15. The control sub-system of claim 14, wherein the controller is configured to:
  operate the steam boiler and one or more of the air blower, the fuel blower, the fuel flow regulator, and the add-on load via use of the electrical current generated by the fuel-cell; and
  supply steam generated by the steam boiler to the fuel-cell.

16. A power generation system, comprising:
  a fuel-cell;
  at least one auxiliary load;
  a control sub-system operatively coupled to the fuel-cell and the at least one auxiliary load, the control sub-system comprising:
    a sensor coupled to the fuel-cell and configured to generate an electrical signal indicative of an electrical current generated by the fuel-cell;
    one or more switches coupled between the fuel-cell and the at least one auxiliary load;
    a controller operatively coupled to the sensor and the one or more switches, wherein the controller is configured to:
      detect a water deficient condition of the fuel-cell based on the electrical signal generated by the sensor; and
      operate, if the water deficient condition is detected, the at least one auxiliary load of the power generation system via use of the electrical current generated by the fuel-cell to maintain a steam-carbon ratio in the fuel-cell above a threshold steam-carbon ratio value.

17. The power generation system of claim 16, further comprising an inverter, a direct-current (DC) link, and an alternating-current (AC) link, wherein an input power port of the inverter is electrically connected to the fuel-cell via the DC-link and an output power port of the inverter is electrically connected to the AC-link, and wherein the one or more switches are coupled to the fuel-cell via the DC-link or the AC-link.

18. The power generation system of claim 16, wherein the at least one auxiliary load comprises a steam boiler, an air blower, a fuel blower, a fuel flow regulator, an add-on load, or combinations thereof.

19. The power generation system of claim 18, wherein the steam boiler is coupled to a water source and configured to generate steam using water received from the water source.

20. The power generation system of claim 18, further comprising:
  a fuel reformer;
  a water separator fluidly coupled to the fuel reformer; and
  an internal water tank fluidly coupled to the water separator and configured to receive water from the fuel reformer,
  wherein the steam boiler is coupled to the internal water tank and configured to receive the water from the internal water tank and generate steam using the water received from the internal water tank.

* * * * *